United States Patent
Dhanabalan et al.

(10) Patent No.: US 11,558,417 B2
(45) Date of Patent: Jan. 17, 2023

(54) SYSTEM AND METHOD FOR IMPROVED ACCESSING OF A SHARED OBJECT

(71) Applicant: Citrix Systems, Inc., Burlington, MA (US)

(72) Inventors: Praveen Raja Dhanabalan, Bangalore (IN); Anudeep Narasimhaprasad Athlur, Bangalore (IN)

( * ) Notice: Subject to any disclaimer, the term of this patent is extended or adjusted under 35 U.S.C. 154(b) by 230 days.

(21) Appl. No.: 16/399,189

(22) Filed: Apr. 30, 2019

(65) Prior Publication Data
US 2020/0351277 A1   Nov. 5, 2020

(51) Int. Cl.
H04L 29/06   (2006.01)
H04L 9/40   (2022.01)

(52) U.S. Cl.
CPC ........ H04L 63/145 (2013.01); H04L 63/0471 (2013.01); H04L 63/1416 (2013.01)

(58) Field of Classification Search
CPC ............... H04L 63/14–63/145; H04L 63/0471
See application file for complete search history.

(56) References Cited

U.S. PATENT DOCUMENTS

| | | | | |
|---|---|---|---|---|
| 8,353,037 | B2* | 1/2013 | Franklin | G06F 21/552 726/23 |
| 8,533,834 | B1* | 9/2013 | Wong | H04L 63/14 726/24 |
| 8,635,441 | B2* | 1/2014 | Frenkel | H04L 63/0428 713/153 |
| 9,027,143 | B1* | 5/2015 | Agrawal | G06F 21/51 726/26 |
| 10,073,971 | B2* | 9/2018 | Jain | G06F 21/53 |
| 2008/0040503 | A1 | 2/2008 | Kleks | |
| 2008/0295176 | A1* | 11/2008 | Holostov | G06F 21/562 726/24 |
| 2009/0006853 | A1* | 1/2009 | Li | H04L 63/0428 713/176 |
| 2009/0288166 | A1* | 11/2009 | Brown | G06F 21/51 726/23 |
| 2013/0080772 | A1 | 3/2013 | McGowan | |
| 2014/0013112 | A1 | 1/2014 | Cidon et al. | |

OTHER PUBLICATIONS

European Search Report issued in counterpart application Serial No. EP 20 17 1672 on Sep. 16, 2020, Attorney Docket No. 054386.00137.
Communication pursuant to Article 94(3) RPC in European Patent Application No. 20171672.7 dated Sep. 21, 2021.

* cited by examiner

*Primary Examiner* — Madhuri R Herzog (57) ABSTRACT

A method, computer program product, and computer system for receiving, by a computing device, a plurality of file segments of a file, the plurality of file segments being received individually by the computing device. A first file segment of the file may be scanned to identify the presence of malware within the file segment. The first file segment of the file may be encrypted to create an encrypted file segment in response to identification by the scan of the first file segment that malware is absent from the first file segment. The encrypted file segment of the file may be sent to another computing device before a second file segment of the file is received by the computing device.

12 Claims, 5 Drawing Sheets

SYSTEM AND METHOD FOR IMPROVED ACCESSING OF A SHARED OBJECT

BACKGROUND

Typically, accessing a shared file over an environment such as a cloud computing environment may involve multiple steps. These steps often times involve the file being uploaded to the cloud computing environment service. Once uploaded, the file may be scanned to detect potential security issues. If no security flag is raised as a result of the scan, then a download of the file to the recipient computing device may be triggered.

BRIEF SUMMARY OF DISCLOSURE

In one example implementation, a method, performed by one or more computing devices, may include but is not limited to receiving, by a computing device, a plurality of file segments of a file, the plurality of file segments being received individually by the computing device. A first file segment of the file may be scanned to identify the presence of malware within the file segment. The first file segment of the file may be encrypted to create an encrypted file segment in response to identification by the scan of the first file segment that malware is absent from the first file segment. The encrypted file segment of the file may be sent to another computing device before a second file segment of the file is received by the computing device.

One or more of the following example features may be included. It may be determined that the file is valid and it may be determined that the file is completely downloaded to the another computing device. The another computing device may be sent information to decrypt at least the encrypted file segment of the file in response to determining that each segment of the file is valid and in response to determining that the each segment of the file is completely downloaded to the another computing device. The second file segment of the file may be received by the computing device, the second file segment of the file may be encrypted to create an encrypted second file segment of the file, and the encrypted second file segment of the file may be sent to the another computing device downloading the encrypted second portion of the file before a third file segment of the file is received by the computing device. The second file segment of the file may be scanned to determine validity of the second file segment of the file. At least one of the another computing device may be sent information to decrypt the encrypted second file segment of the file in response to determining that the second file segment of the file is valid and the information may be prevented from being sent to the another computing device to decrypt the encrypted second file segment of the file in response to determining that the second file segment of the file is invalid. The information to decrypt the encrypted file segment of the file may be different than the information to decrypt the encrypted second file segment of the file.

In another example implementation, a computing system may include one or more processors and one or more memories configured to perform operations that may include but are not limited to receiving, by a computing device, a plurality of file segments of a file, the plurality of file segments being received individually by the computing device. A first file segment of the file may be scanned to identify the presence of malware within the file segment. The first file segment of the file may be encrypted to create an encrypted file segment in response to identification by the scan of the first file segment that malware is absent from the first file segment. The encrypted file segment of the file may be sent to another computing device before a second file segment of the file is received by the computing device.

One or more of the following example features may be included. It may be determined that the file is valid and it may be determined that the file is completely downloaded to the another computing device. The another computing device may be sent information to decrypt at least the encrypted file segment of the file in response to determining that each segment of the file is valid and in response to determining that the each segment of the file is completely downloaded to the another computing device. The second file segment of the file may be received by the computing device, the second file segment of the file may be encrypted to create an encrypted second file segment of the file, and the encrypted second file segment of the file may be sent to the another computing device downloading the encrypted second portion of the file before a third file segment of the file is received by the computing device. The second file segment of the file may be scanned to determine validity of the second file segment of the file. At least one of the another computing device may be sent information to decrypt the encrypted second file segment of the file in response to determining that the second file segment of the file is valid and the information may be prevented from being sent to the another computing device to decrypt the encrypted second file segment of the file in response to determining that the second file segment of the file is invalid. The information to decrypt the encrypted file segment of the file may be different than the information to decrypt the encrypted second file segment of the file.

In another example implementation, a computer program product may reside on a computer readable storage medium having a plurality of instructions stored thereon which, when executed across one or more processors, may cause at least a portion of the one or more processors to perform operations that may include but are not limited to receiving, by a computing device, a plurality of file segments of a file, the plurality of file segments being received individually by the computing device. A first file segment of the file may be scanned to identify the presence of malware within the file segment. The first file segment of the file may be encrypted to create an encrypted file segment in response to identification by the scan of the first file segment that malware is absent from the first file segment. The encrypted file segment of the file may be sent to another computing device before a second file segment of the file is received by the computing device.

One or more of the following example features may be included. It may be determined that the file is valid and it may be determined that the file is completely downloaded to the another computing device. The another computing device may be sent information to decrypt at least the encrypted file segment of the file in response to determining that each segment of the file is valid and in response to determining that the each segment of the file is completely downloaded to the another computing device. The second file segment of the file may be received by the computing device, the second file segment of the file may be encrypted to create an encrypted second file segment of the file, and the encrypted second file segment of the file may be sent to the another computing device downloading the encrypted second portion of the file before a third file segment of the file is received by the computing device. The second file segment of the file may be scanned to determine validity of the second file segment of the file. At least one of the another computing device may be sent information to decrypt the encrypted second file segment of the file in response to determining that the second file segment of the file is valid and the information may be prevented from being sent to the another computing device to decrypt the encrypted second file segment of the file in response to determining that the second file segment of the file is invalid. The information to decrypt the encrypted file segment of the file may be different than the information to decrypt the encrypted second file segment of the file.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

BRIEF DESCRIPTION OF THE DRAWINGS

Like reference symbols in the various drawings indicate like elements.

DETAILED DESCRIPTION

Generally, when accessing a shared file over an environment such as a cloud computing environment or data center, multiple steps may be involved. For example, the file may be uploaded to the cloud computing environment service, scanned so that the file may be vetted, and if no security flag is raised as a result of the scan, the file may be triggered to download to the recipient computing device. Generally, the amount of time this process may take may be described as, e.g., T1 for uploading the file+T2 for scanning (and/or encrypting) the file+T3 for downloading the file.

As will be discussed in greater detail below, the security process of the present disclosure may at least help, e.g., to improve existing technology necessarily rooted in computer network technology, and being integrated into the practical application of decreasing the time required to share a file. The security process may improve this time and optimize this process for a better user experience. As will be discussed below, as a portion of a file is uploaded, security processes describe herein may create, e.g., a security token, may encrypt the portion of the file, and may share the portion of the file with all the recipient(s) to pipeline the process, without waiting for the entire file to be uploaded before beginning the scan, encryption, and sharing. Once the security scan is complete, the security process may share the encryption key with the recipient client, which may then be used to decrypt the file. As an example result, the prior amount of time required to share a file (e.g., $T_1+T_2+T_3$) may be reduced to $T_1$+some delta time for sharing (e.g., downloading), as $T_1$ and/or $T_2$ and/or $T_3$ may be done in parallel.

Figure 1A:
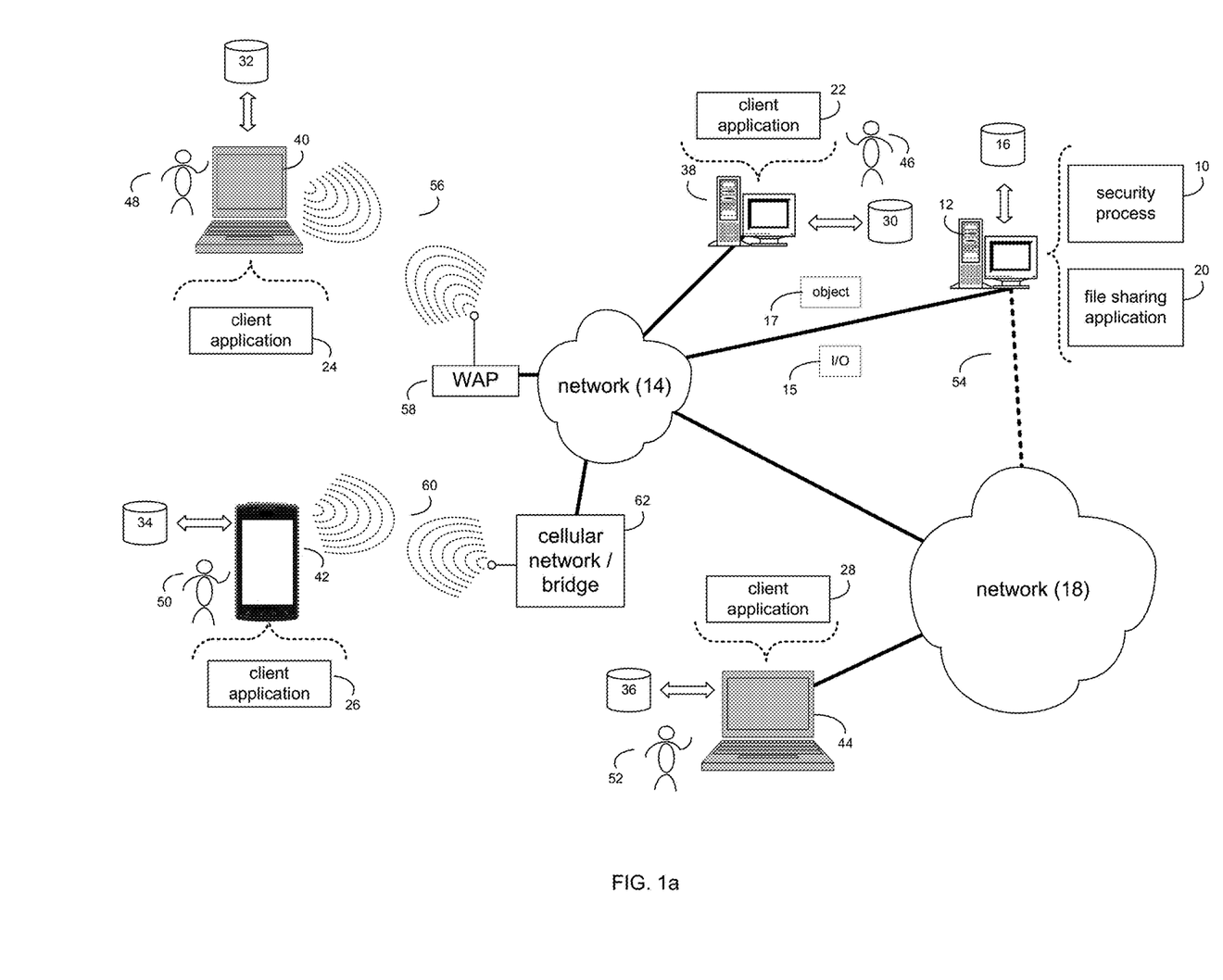
FIG. 1a is an example diagrammatic view of a security process coupled to an example distributed computing network according to one or more example implementations of the disclosure.

Referring now to the example implementation of FIG. 1a, there is shown security process 10 that may reside on and may be executed by a computer (e.g., computer 12), which may be connected to a network (e.g., network 14) (e.g., the internet or a local area network). In some implementations, as will be discussed below in greater detail, the security process 10 may receive, by a computing device 12, a plurality of file segments of a file, the plurality of file segments being received individually by the computing device. A first file segment of the file may be scanned to identify the presence of malware within that file segment. The first file segment of the file may be encrypted to create an encrypted file segment in response to identification by the scan of the first file segment that malware is absent from the first file segment. The encrypted file segment of the file may be sent to another computing device before a second file segment of the file is received by the computing device. Thus, the processes of the present disclosure provide an improvement in electronic transfer of digital information and communications data by increasing the speed of data transfers (e.g., sharing a file) between computing devices without adversely affecting the security of the computing device in receipt of the data.

In some implementations, the instruction sets and subroutines of security process 10, which may be stored on storage device, such as storage device 16, coupled to computer 12, may be executed by one or more processors and one or more memory architectures included within computer 12. In some implementations, security process 10 may be a component of a data store, a standalone application that interfaces with the above noted data store and/or an applet/application that is accessed via client applications 22, 24, 26, 28. In some implementations, the above noted data store may be, in whole or in part, distributed in a cloud computing topology. In this way, computer 12 and storage device 16 may refer to multiple devices, which may also be distributed throughout the network.

In some implementations, security process 10 and/or file sharing application 20 may be accessed via one or more of client applications 22, 24, 26, 28 to facilitate the transfer of data and/or information among computer 12 and client electronic devices 38, 40, 42, and 44. Client electronic devices 38, 40, 42, 44 (and/or computer 12) may include, but are not limited to, a personal computer (e.g., client electronic device 38), a laptop computer (e.g., client electronic device 40), a smart/data-enabled, cellular phone (e.g., client electronic device 42), and a notebook computer (e.g., client electronic device 44).

In some implementations, computer 12 may execute a file sharing application (e.g., file sharing application 20), examples of which may include, but are not limited to, e.g., a web conferencing application, a video conferencing application, a voice-over-IP application, a video-over-IP application, an Instant Messaging (IM)/"chat" application, a short messaging service (SMS)/multimedia messaging service (MMS) application, or other application that allows for file sharing. An example of file sharing application 20 may include, but is not limited to, e.g., ShareFile® by Citrix Systems, Inc. of Ft. Lauderdale, Fla.

In some implementations, security process 10 may be a standalone application, or may be an applet/application/script/extension that may interact with and/or be executed within file sharing application 20, a component of file sharing application 20, and/or one or more of client applications 22, 24, 26, 28. In some implementations, file sharing application 20 may be a standalone application, or may be an applet/application/script/extension that may interact with and/or be executed within security process 10, a component of security process 10, and/or one or more of client applications 22, 24, 26, 28. In some implementations, one or more of client applications 22, 24, 26, 28 may be a standalone application, or may be an applet/application/script/extension that may interact with and/or be executed within and/or be a component of security process 10 and/or file sharing application 20. Examples of client applications 22, 24, 26, 28 may include, but are not limited to, e.g., a web conferencing application, a video conferencing application, a voice-over-IP application, a video-over-IP application, an Instant Messaging (IM)/"chat" application, a short messaging service (SMS)/multimedia messaging service (MMS) application, or other application that allows for file sharing, a standard and/or mobile web browser, an email application (e.g., an email client application), a textual and/or a graphical user interface, a customized web browser, a plugin, an Application Programming Interface (API), or a custom application. The instruction sets and subroutines of client applications 22, 24, 26, 28, which may be stored on storage devices 30, 32, 34, 36, coupled to client electronic devices 38, 40, 42, 44, may be executed by one or more processors and one or more memory architectures incorporated into client electronic devices 38, 40, 42, 44.

In some implementations, one or more of client applications 22, 24, 26, 28 may be configured to effectuate some or all of the functionality of security process 10 (and vice versa). Accordingly, in some implementations, security process 10 may be a purely server-side application, a purely client-side application, or a hybrid server-side/client-side application that is cooperatively executed by one or more of client applications 22, 24, 26, 28 and/or security process 10.

In some implementations, one or more of client applications 22, 24, 26, 28 may be configured to effectuate some or all of the functionality of file sharing application 20 (and vice versa). Accordingly, in some implementations, file sharing application 20 may be a purely server-side application, a purely client-side application, or a hybrid server-side/client-side application that is cooperatively executed by one or more of client applications 22, 24, 26, 28 and/or file sharing application 20. As one or more of client applications 22, 24, 26, 28, security process 10, and file sharing application 20, taken singly or in any combination, may effectuate some or all of the same functionality, any description of effectuating such functionality via one or more of client applications 22, 24, 26, 28, security process 10, file sharing application 20, or combination thereof, and any described interaction(s) between one or more of client applications 22, 24, 26, 28, security process 10, file sharing application 20, or combination thereof to effectuate such functionality, should be taken as an example only and not to limit the scope of the disclosure.

In some implementations, one or more of users 46, 48, 50, 52 may access computer 12 and security process 10 (e.g., using one or more of client electronic devices 38, 40, 42, 44) directly through network 14 or through secondary network 18. Further, computer 12 may be connected to network 14 through secondary network 18, as illustrated with phantom link line 54. Security process 10 may include one or more user interfaces, such as browsers and textual or graphical user interfaces, through which users 46, 48, 50, 52 may access security process 10.

In some implementations, various I/O requests (e.g., I/O request 15) may be sent from, e.g., client applications 22, 24, 26, 28 to, e.g., computer 12 (and vice versa). Examples of I/O request 15 may include but are not limited to, data write requests (e.g., a request that content be written to computer 12) and data read requests (e.g., a request that content be read from computer 12).

Figure 1B:
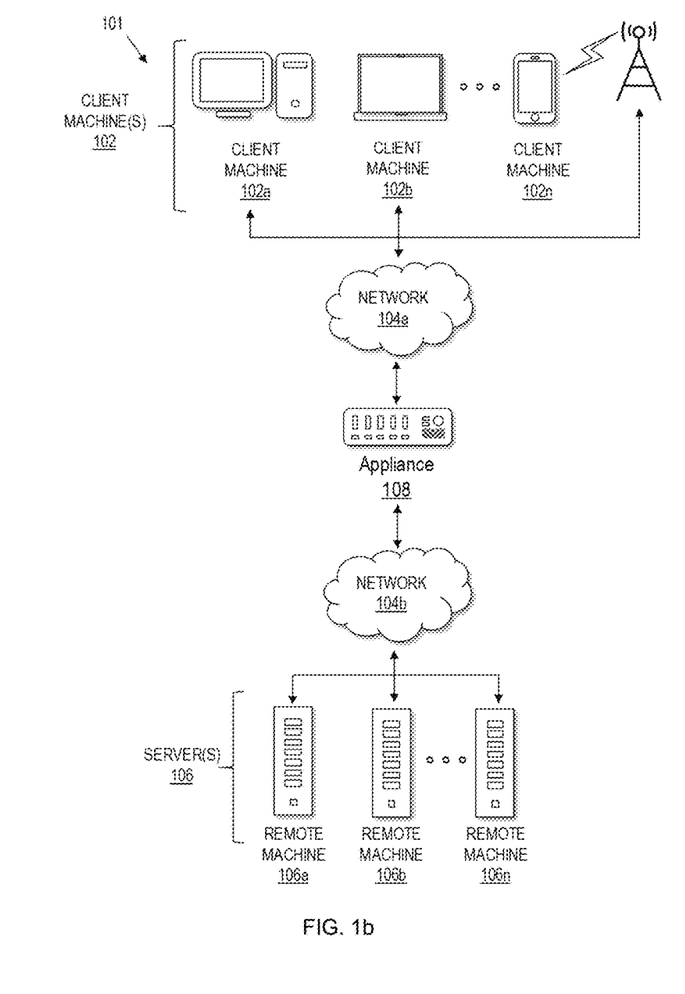
FIG. 1b is an example diagrammatic view of an alternative network environment according to one or more example implementations of the disclosure.

Referring now to the example implementation of FIG. 1b, another non-limiting network environment 101 is shown in which various aspects of the present disclosure may be implemented, which may include one or more client machines 102A-102N (which in some implementations may include as the above-noted client electronic devices), one or more remote machines 106A-106N (which in some implementations may include the above-noted computer 12), one or more networks 104a, 104b (which in some implementations may include the above-noted networks 14 and 18), and one or more appliances 108 installed within computing environment 101. Client machines 102A-102N may communicate with remote machines 106A-106N (and vice versa) via networks 104a, 104b.

Examples of client machines 102A-102N (and/or one or more of the computing devices described above) may include, but are not limited to, a storage system (e.g., a Network Attached Storage (NAS) system, a Storage Area Network (SAN)), a personal computer(s), a laptop computer(s), mobile computing device(s), a server computer, a series of server computers, a mainframe computer(s), or a computing cloud(s). A SAN may include one or more of the client electronic devices, including a Redundant Array of Independent Disks (RAID) device and a NAS system. In some implementations, each of the aforementioned may be generally described as a computing device. In certain implementations, a computing device may be a physical or virtual device. In many implementations, a computing device may be any device capable of performing operations, such as a dedicated processor, a portion of a processor, a virtual processor, a portion of a virtual processor, portion of a virtual device, or a virtual device. In some implementations, a processor may be a physical processor or a virtual processor. In some implementations, a virtual processor may correspond to one or more parts of one or more physical processors. In some implementations, the instructions/logic may be distributed and executed across one or more processors, virtual or physical, to execute the instructions/logic. The computing devices may execute an operating system, for example, but not limited to, Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

In some implementations, client machines 102A-102N can include storage devices (e.g., storage device 16) such as: a hard disk drive; all forms of flash memory storage devices; a tape drive; an optical drive; a RAID array (or other array); a random access memory (RAM); a read-only memory (ROM); or combination thereof. In some implementations, storage device 16 may be organized as an extent, an extent pool, a RAID extent (e.g., an example 4D+1P R5, where the RAID extent may include, e.g., five storage device extents that may be allocated from, e.g., five different storage devices), a mapped RAID (e.g., a collection of RAID extents), or combination thereof. In some implementations, client machines 102A-102N (e.g., computer 12 of FIG. 1a) may include a data store, such as a database (e.g., relational database, object-oriented database, triplestore database, etc.) and may be located within any suitable memory location (e.g., storage device 16 coupled to computer 12 of FIG. 1a).

In some implementations, client machines 102A-102N may be communicatively coupled to data stores (e.g., 16 of FIG. 1a) so that data, metadata, information, etc. described throughout the present disclosure may be stored. In some implementations, client machines 102A-102N may utilize any known database management system (e.g., 16 of FIG. 1a) in order to provide multi-user access to one or more databases, such as the above noted relational database. In some implementations, the data store may also be a custom database, such as, for example, a flat file database or an XML database. In some implementations, any other form(s) of a data storage structure and/or organization may also be used.

In some implementations, storage devices (e.g., 30, 32, 34, and 36 of FIG. 1a) can be communicatively coupled to the client machines 102A-102N to store data, metadata, or other information to facilities operation of the system. The storage devices may include but are not limited to: hard disk drives; flash drives, tape drives; optical drives; RAID arrays; random access memories (RAM); and read-only memories (ROM). Examples of client electronic devices a tablet, a server, a television, a smart television, a smart speaker, an Internet of Things (IoT) device, a media (e.g., audio/video, photo, etc.) capturing and/or output device, an audio input and/or recording device (e.g., a handheld microphone, a lapel microphone, an embedded microphone (such as those embedded within eyeglasses, smart phones, tablet computers and/or watches, etc.), and a dedicated network device. In some implementations, client machines 102A-102N may communicate with remote machines 106A-106N via intermediary appliance 108. Appliance 108 may be positioned between networks 104a, 104b and may also be referred to as a network interface or gateway. In some implementations, appliance 108 may operate as an application delivery controller (ADC) to provide clients with access to business applications and other data deployed in a datacenter, a cloud environment, or delivered as Software as a Service (SaaS) across a range of client machines, and/or provide other functionality such as load balancing, etc. In some implementations, multiple appliances 108 may be used, and appliance(s) 108 may be deployed as part of network 104a and/or 104b.

In some implementations, the various client machines 102A-102N (e.g., client electronic devices of FIG. 1a) may be directly or indirectly coupled to a network (e.g., networks 14 or 18 of FIG. 1a or networks 104a or 104b of FIG. 1b). For example, client machines 102A-102N are shown directly coupled to network 104A via a network connection (e.g., a wireless or a hardwired network connection). Further, in some examples, a wireless communication connection can include a wireless access point (e.g., WAP 58 of FIG. 1a). The wireless access point may be, for example, an IEEE 802.11a, 802.11b, 802.11g, 802.11n, 802.11ac, Wi-Fi®, RFID, and/or Bluetooth™ (e.g., 802.15) (including Bluetooth™ Low Energy) device that is capable of establishing wireless communication channel (e.g., communications channel 56 between client electronic device 40 and WAP 58 shown in FIG. 1a). In some examples, client machines 102A-102N (e.g., client electronic device 42 of FIG. 1a) can be wirelessly coupled to a network via wireless communication channel (e.g., channel 60 shown in FIG. 1a) using cellular network/bridge (e.g., bridge 62 of FIG. 1a).

In some implementations, network 104a and 104b may be connected to one or more secondary networks (e.g., network 18 of FIG. 1a), examples of which may include but are not limited to: a local area network; a wide area network or other telecommunications network facility; or an intranet, for example. The phrase "telecommunications network facility," as used herein, may refer to a facility configured to transmit, and/or receive transmissions to/from one or more mobile client electronic devices (e.g., cellphones, etc.) as well as many others.

In some implementations, some or all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. Bluetooth™ (including Bluetooth™ Low Energy) is a telecommunications industry specification that allows, e.g., mobile phones, computers, smart phones, and other electronic devices to be interconnected using a short-range wireless connection. Other forms of interconnection (e.g., Near Field Communication (NFC)) may also be used. Client machines 102A-102N may be generally referred to as client machines 102, local machines 102, clients 102, client nodes 102, client computers 102, client devices 102, client electronic devices 102, computing devices 102, endpoints 102, or endpoint nodes 102. Examples of client machines 102A-102N include a tablet, a server, a television, a smart television, a smart speaker, an Internet of Things (IoT) device, a media (e.g., audio/video, photo, etc.) capturing and/or output device, an audio input and/or recording device (e.g., a handheld microphone, a lapel microphone, an embedded microphone (such as those embedded within eyeglasses, smart phones, tablet computers and/or watches, etc.), and a dedicated network device. Client electronic devices 102A-102N may each execute an operating system, examples of which may include but are not limited to, Android™, Apple® iOS®, Mac® OS X®; Red Hat® Linux®, Windows® Mobile, Chrome OS, Blackberry OS, Fire OS, or a custom operating system.

Remote machines 106A-106N may be generally referred to as servers 106 or server farm 106. In some implementations, client device 102 may have the capacity to function as both a client node seeking access to resources provided by server 106 and as server 106 providing access to hosted resources for other client devices 102A-102N. Networks 104a, 104b may be generally referred to as network 104. Network 104 may be configured in any combination of wired and wireless networks.

Server 106 may be any server type such as, for example: a file server; an application server; a web server; a proxy server; an appliance; a network appliance; a gateway; an application gateway; a gateway server; a virtualization server; a deployment server; a Secure Sockets Layer Virtual Private Network (SSL VPN) server; a firewall; a web server; a server executing an active directory; a cloud server; or a server executing an application acceleration program that provides firewall functionality, application functionality, or load balancing functionality. Server 106 may execute, operate or otherwise provide an application that may be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions.

In some implementations, server 106 may execute a remote presentation services program or other program that uses a thin-client or a remote-display protocol to capture display output generated by an application executing on server 106 and transmit the application display output to client device 102.

In yet other implementations, server 106 may execute a virtual machine providing, to a user of client device 102, access to a computing environment. Client device 102 may be a virtual machine. The virtual machine may be managed by, for example, a hypervisor, a virtual machine manager (VMM), or any other hardware virtualization technique within server 106.

In some implementations, network 104 may be: a local-area network (LAN); a metropolitan area network (MAN); a wide area network (WAN); a primary public network 104; and a primary private network 104. Additional implementations may include a network 104 of mobile telephone networks that use various protocols to communicate among mobile devices. For short range communications within a wireless local-area network (WLAN), the protocols may include 802.11, Bluetooth™, and Near Field Communication (NFC).

Figure 2:
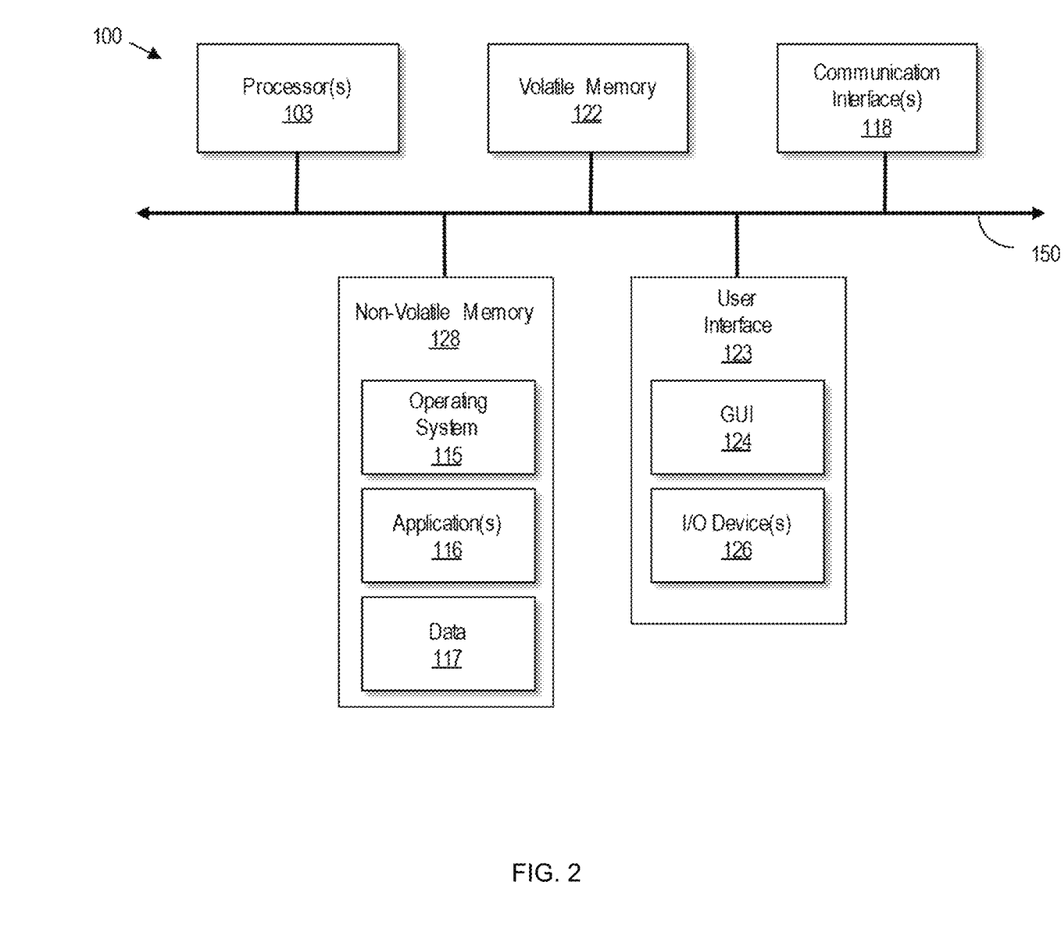
FIG. 2 is an example diagrammatic view of a computing device of FIG. 1b according to one or more example implementations of the disclosure.

Referring also to the example implementation of FIG. 2, there is shown a block diagram of computing device 100 that may be useful for practicing an implementation of client devices 102, appliances 108 and/or servers 106. Computing device 100 may include one or more processors 103, volatile memory 122 (e.g., random access memory (RAM)), non-volatile memory 128, user interface (UI) 123, one or more communications interfaces 118, and a communications bus 150.

Non-volatile memory 128 may include: one or more hard disk drives (HDDs) or other magnetic or optical storage media; one or more solid state drives (SSDs), such as a flash drive or other solid-state storage media; one or more hybrid magnetic and solid-state drives; and/or one or more virtual storage volumes, such as a cloud storage, or a combination of such physical storage volumes and virtual storage volumes or arrays thereof.

UI 123 may include a graphical user interface (GUI) 124 (e.g., a touchscreen, a display, etc.) and one or more input/output (I/O) devices 126 (e.g., a mouse, a keyboard, a microphone, one or more speakers, one or more cameras, one or more biometric scanners, one or more environmental sensors, and one or more accelerometers, etc.).

Non-volatile memory 128 may store operating system 115, one or more applications 116, and data 117 such that, for example, computer instructions of operating system 115 and/or applications 116 are executed by processor(s) 103 out of volatile memory 122. In some implementations, volatile memory 122 may include one or more types of RAM and/or a cache memory that may offer a faster response time than a main memory. Data may be entered using an input device of GUI 124 or received from I/O device(s) 126. Various elements of computer 100 may communicate via communications bus 150.

Computing device 100 is shown merely as an example client device or server, and may be implemented by any computing or processing environment with any type of machine or set of machines that may have suitable hardware and/or software capable of operating as described herein.

Processor(s) 103 may be implemented by one or more programmable processors to execute one or more executable instructions, such as a computer program, to perform the functions of the system. As used herein, the term "processor" may describe circuitry that performs a function, an operation, or a sequence of operations. The function, operation, or sequence of operations may be hard coded into the circuitry or soft coded by way of instructions held in a memory device and executed by the circuitry. A processor may perform the function, operation, or sequence of operations using digital values and/or using analog signals.

In some implementations, the processor may be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory.

Processor 103 may be analog, digital or mixed-signal. In some implementations, processor 103 may be one or more physical processors, or one or more virtual (e.g., remotely located or cloud) processors. A processor including multiple processor cores and/or multiple processors may provide functionality for parallel, simultaneous execution of instructions or for parallel, simultaneous execution of one instruction on more than one piece of data.

Communications interfaces 118 may include one or more interfaces to enable computing device 100 to access a computer network such as a Local Area Network (LAN), a Wide Area Network (WAN), a Personal Area Network (PAN), or the Internet through a variety of wired and/or wireless connections, including cellular connections.

In described implementations, computing device 100 may execute an application (e.g., the above-noted client application) on behalf of a user of a client device. For example, computing device 100 may execute one or more virtual machines managed by a hypervisor. Each virtual machine may provide an execution session within which applications execute on behalf of a user or a client device, such as a hosted desktop session. Computing device 100 may also execute a terminal services session to provide a hosted desktop environment. Computing device 100 may provide access to a remote computing environment including one or more applications, one or more desktop applications, and one or more desktop sessions in which one or more applications may execute.

Figure 3:
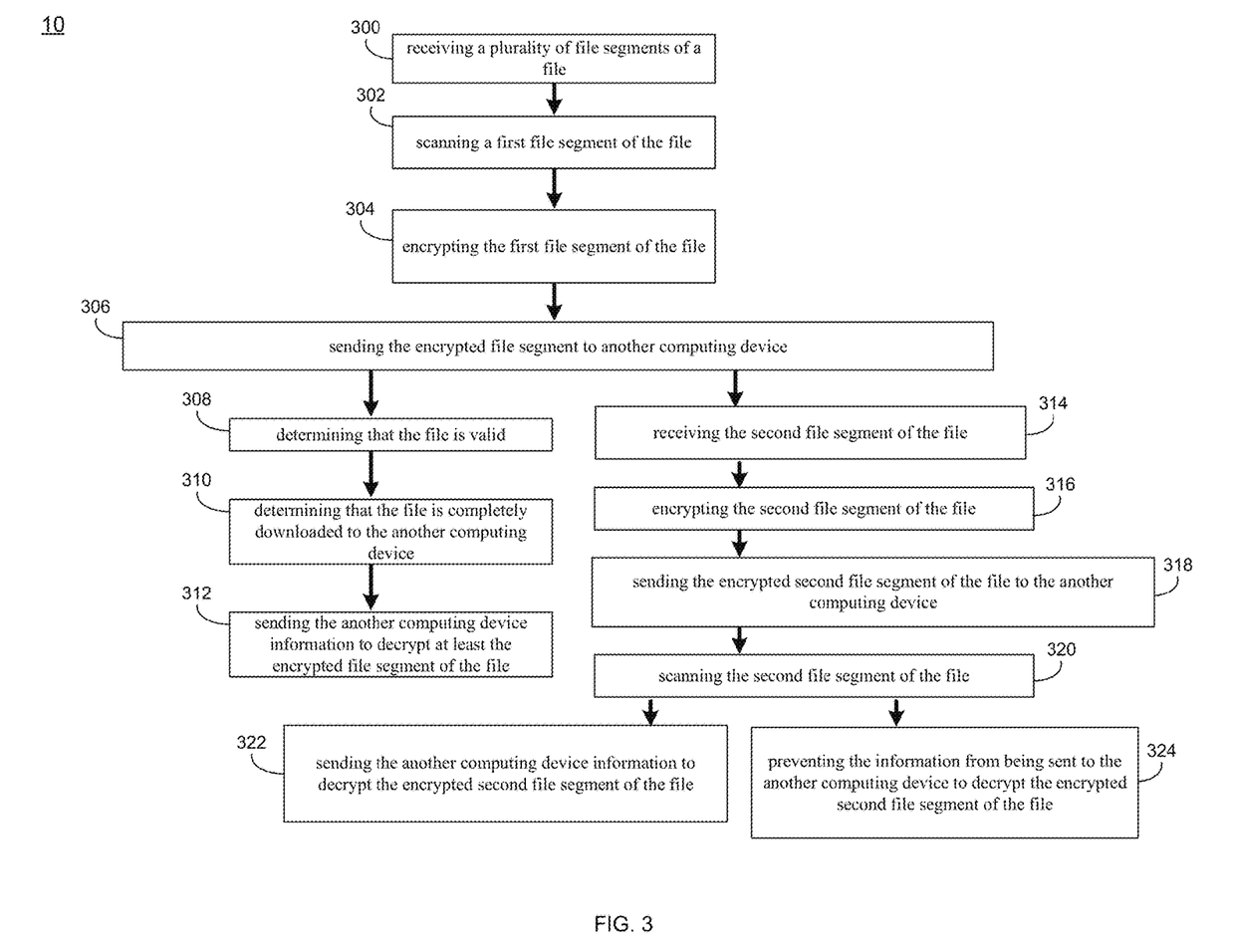
FIG. 3 is an example flowchart of a security process according to one or more example implementations of the disclosure.
Figure 4:
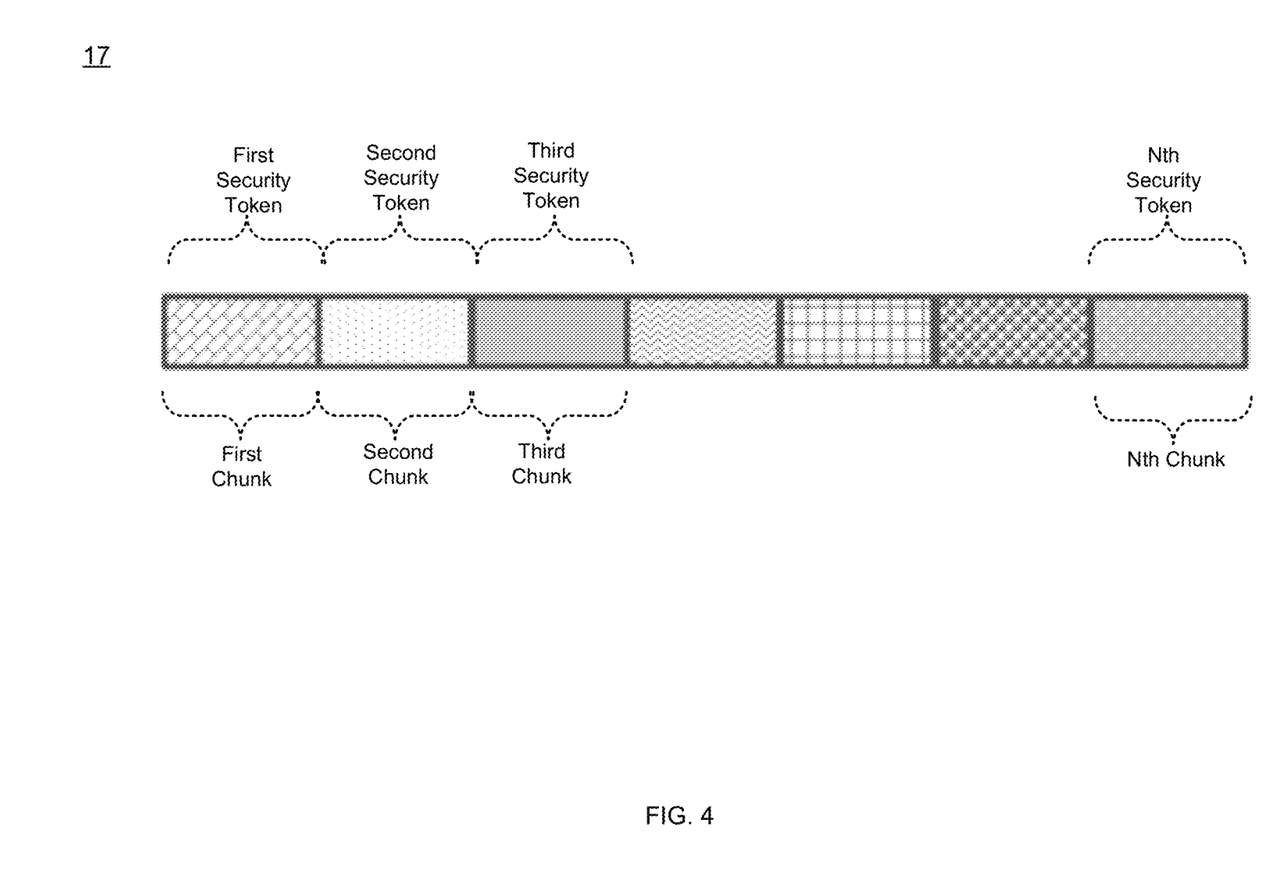
FIG. 4 is an example diagrammatic view of a video file according to one or more example implementations of the disclosure.

As discussed above and referring also at least to the example implementations of FIGS. 3-4, a computing device may (e.g., via security process 10), receive 300 a plurality of file segments of a file, the plurality of file segments being received individually by the computing device. The computing device (e.g., via security process 10) may scan 302 a first file segment of the file to identify the presence of malware within the file segment. The computing device (e.g., via security process 10) may encrypt 304 the first file segment of the file to create an encrypted file segment in response to identification by the scan of the first file segment that malware is absent from the first file segment. The computing device (e.g., via security process 10) may send 306 the encrypted file segment of the file to another computing device before a second file segment of the file is received by the computing device.

In some implementations, a computing device (e.g., computer 12) may (e.g., via security process 10), receive 300 a plurality of file segments of a file, the plurality of file segments being received individually by the computing device. For instance, assume for example purposes only that a user (e.g., user 46 via client electronic device 38) is attempting to upload a file (e.g., file 17) to computer 12 so that the file may be shared with another user (e.g., user 52 via client electronic device 44). In the example, security process 10 may receive 300 the first file segment (e.g., a first block of the file) of the file while the remainder of the entire file is being uploaded. In some implementations, the size of the block may vary in size. For instance, the size of the block may depend on the encryption algorithm (e.g., AES256 may have a block size of 256 bits (32 bytes) or multiple of 32 bytes). However, it will be appreciated that other sized blocks may be used without departing from the scope of the disclosure.

In some implementations, the computing device (e.g., via security process 10) may scan 302 a first file segment of file 17 to identify the presence of malware within that file segment. For instance, after the first file segment (or block) of the file is received, security process 10 may begin scanning 302 the first file segment of the file (e.g., for viruses, malware, etc.). Should any portion of the file contain malware or other suspicious code, the file as a whole may be determined to be invalid. Conversely, should any portion of the file lack malware or suspicious code, that portion of the file may be considered valid, and should the entire file lack malware or suspicious code, the entire file may be considered valid. In some implementations, the scanning 302 may occur prior to the entire file being uploaded to computer 12 and may be cumulative as other segments of the file are being uploaded. As such, at least some of the uploading and scanning of the file may occur in parallel.

In some implementations, computer 12 (e.g., via security process 10) may encrypt 304 the first file segment of the file to create an encrypted file segment in response to identification by the scan of the first file segment that malware is absent from the first file segment. For instance, in some implementations, as soon as computer 12 (e.g., via security process 10) receives any portion of the first file segment of the file (from client electronic device 38), security process 10 may create, e.g., a random security token or other encryption technique. Using the random security token, security process 10 may encrypt 304 the first file segment (e.g., block) of the file, which may occur prior to the entire file being uploaded to computer 12 and/or scanned 302. As such, at least some of the uploading and encrypting of the file may occur in parallel. In some implementations, security process 10 may encrypt 304 the first segment of the file prior to beginning the scan of the first segment and/or prior to completing the scan of the first segment.

In some implementations, computer 12 (e.g., security process 10) may send 306 the encrypted file segment of file 17 to another computing device (e.g., client electronic device 44) downloading the encrypted first portion of file 17 before a second portion of the file is received by the computing device (e.g., computer 12) for scanning. For instance, in some implementations, after computer 12 (e.g., via security process 10) encrypts the first file segment of the file (with the above-noted security token), the encrypted first file segment may be sent 306 to client electronic device 44 to be downloaded. As such, before, during, or after the first file segment of the file is being scanned at computer 12, security process 10 may encrypt and send the first file segment of the file to client electronic device 44 (and/or other recipients) for download without waiting for the entire file (or even a subsequent file segment of the file) to be uploaded, scanned and/or encrypted at computer 12. As such, at least some of the uploading, scanning, downloading, and/or encrypting of the file may occur in parallel. That is, in the above example, a second file segment of the file may be in the process of being uploaded, while at the same time (i.e., in parallel), the first file segment of the file that was already uploaded may be scanned, encrypted, and/or downloaded to client electronic device 44. Therefore, unlike systems that may need to wait for the entire file to be uploaded, then scanned, and then encrypted before being available for download to the recipient computing device, security process 10 may enable one or more of these tasks to be accomplished at the same time for individual segments of the file, thereby expediting the process. However, as noted above, the first file segment of the file sent to the client electronic device 44 may be encrypted with the security token, which at this time may be known only to security process 10 at computer 12. In some implementations, the triggering of the scan and/or encryption may occur upon the successful uploading of the file segment (e.g., at computer 12), and the triggering of the downloading of the encrypted file segment to the recipient computing device (or at least being available for download) may occur upon completion of the file segment being encrypted.

In some implementations, computer 12 (e.g., via security process 10) may determine 308 that file 17 is valid, may determine 310 that file 17 is completely downloaded to the another computing device (e.g., client electronic device 44), and may send 312 client electronic device 44 information (e.g., security token, key, etc.) to decrypt the encrypted file segment of file 17 in response to determining 308 that each portion of file 17 is valid and in response to determining 310 that the each portion of file 17 is completely downloaded to client electronic device 44. For instance, and continuing with the above example, assume that the entire file (e.g., each segment of the file) has been successfully uploaded to computer 12 and scanned. In the example, further assume that the scan of each segment of the file enables security process 10 to determine 308 that the entire file is valid (e.g., secure, without a virus/malware, etc.), and that security process 10 determines 310 that each segment of the file has been successfully downloaded to client electronic device 44. In the example, since security process 10 determines 308 that the entire file is valid (e.g., secure), and determines 310 that each segment of the file has been successfully downloaded to client electronic device 44, security process 10 may send 312 client electronic device 44 the above-noted security token (or other necessary information), enabling client electronic device 44 to decrypt and use the file. In some implementations, if the scan of any portion of the file yields a negative result (e.g., an invalid or unsecure file), security process 10 may send a message to client electronic device 44 to delete the file, and may preclude the sending of the security token to client electronic device 44 so that the file may not be used. It will be appreciated that security process 10 may send client electronic device 44 the security token prior to scanning the entire file (e.g., upon creation of the security token); however, sending the security token only after the entire file is determined to be secure may advantageously help prevent a potentially unsecure file (e.g., with a virus) from being opened.

In some implementations, if the file download halts for some reason (e.g., due to some network issue or otherwise), security process 10 may, e.g., notify user 52 that the file download is incomplete, urge user 52 to manually delete the file, or have all files downloaded in a temporary storage location to be pushed to the intended storage location on client electronic device 44 only after the download is complete.

In some implementations, security process 10 may process the sharing of the file the same way if the file (file 17) is, e.g., a video file. In some implementations, security process 10 may process the file sharing different if the file (file 17) is a video file, e.g., by encrypting chunks of video file, so that user 52 may stream the video file on the fly. For instance, and referring at least to the example implementation of FIG. 4, an example video file to be shared is shown. In the example, the video file may be divided up into chunks (e.g., first chunk, second chunk, third chunk, $N^{th}$ chunk, etc.) using any appropriate chunking technique.

In some implementations, computer 12 (e.g., security process 10) may receive 314 the second file segment of file 17 uploading from client electronic device 38. For instance, similar to the above discussion, assume for example purposes only that user 46 (via client electronic device 38) is attempting to upload the video file to computer 12 so that the video file may be shared with user 52 (via client electronic device 44 of FIG. 1). In the example, computer 12 (via security process 10) may receive 314 the second file segment of the video file (e.g., second chunk of the video file) while the remaining chunks of the video file (e.g., third chunk, fourth chunk, etc.) are in the process of being uploaded to computer 12. Put another way, the second chunk of the video file may be received (uploaded) at computer 12, but a subsequent third chunk and fourth chunk of the video file may not yet have been received (uploaded) at computer 12.

In some implementations, computer 12 (e.g., security process 10) may encrypt 316 the second file segment (second chunk) of file 17 to create an encrypted second chunk of file 17. For instance, in some implementations, computer 12 (e.g., via security process 10) receives at least a portion of the second chunk of the video file (from client electronic device 38), security process 10 may create, e.g., a random security token, which may be generated using any technique, such as a pseudorandom number. Using the random security token, security process 10 may encrypt 316 the second chunk of the video file, which may occur prior to the entire video file being uploaded to computer 12. That is, in the above example, a third chunk of the video file may be in the process of being uploaded, while at the same time (i.e., in parallel), the second chunk of the video file that was already uploaded may be scanned and/or encrypted. As such, at least some of the uploading and encrypting of the video file may occur in parallel.

In some implementations, computer 12 (e.g., via security process 10) may send 318 the encrypted second chunk of file 17 to client electronic device 44 that is downloading the encrypted second chunk of file 17 before a third file segment (e.g., third chunk) of file 17 is received by computing device 12 for scanning. For instance, in some implementations, after computer 12 (e.g., via security process 10) encrypts the second chunk of the video file (with the above-noted security token), the encrypted second chunk may be sent 318 to client electronic device 44 to be downloaded. As such, before, during, or shortly after the second chunk of the video file is being scanned at computer 12, security process 10 may encrypt and send the second chunk of the video file to client electronic device 44 (or other recipient(s)) for download without waiting for the entire video file (or even a subsequent chunk of the video file such as the third chunk) to be uploaded. That is, in the above example, a third chunk of the video file may be in the process of being uploaded to computer 12, while at the same time (i.e., in parallel), the second chunk of the video file that was already uploaded to computer 12 may be scanned, encrypted, and/or downloaded to client electronic device 44. As such, at least some of the uploading, scanning, encrypting, and/or downloading of the video file may occur in parallel.

In some implementations, computer 12 (e.g., via security process 10) may scan 320 the second chunk of file 17 to determine validity of the second chunk of file 17. For instance, after the second chunk of the video file is received, security process 10 may begin scanning 320 the second chunk of the video file (e.g., for viruses, malware, etc.). In some implementations, the scanning 320 may occur prior to the entire video file being uploaded to computer 12. As such, at least some of the uploading, scanning, encrypting, and/or downloading of the video file may occur in parallel.

In some implementations, computer 12 (e.g., via security process 10) may at least one of send 322 client electronic device 44 information (e.g., security token, key, etc.) to decrypt the encrypted second chunk of file 17 in response to determining that the second chunk of file 17 is valid and may prevent 324 the information from being sent to client electronic device 44 to decrypt the encrypted second chunk of file 17 in response to determining that the second chunk of file 17 is invalid. For instance, and continuing with the above example, assume that the second chunk has been successfully uploaded to computer 12 and scanned. In the example, further assume that the scan of the second chunk of the file enables security process 10 to determine that the second chunk is valid (e.g., secure), and that security process 10 determines that the second chunk of the file has been successfully downloaded to client electronic device 44. In the example, since security process 10 determines that the second chunk is valid (e.g., secure), and determines that the second chunk of the file has been successfully downloaded to client electronic device 44, security process 10 may send 322 client electronic device 44 the above-noted security token, enabling client electronic device 44 to decrypt and use the second chunk of the file. In some implementations, if the scan of the second chunk of the file yields a negative result (e.g., an invalid or unsecure file), security process 10 may prevent 324 the above-noted security token from being sent to client electronic device 44, thereby preventing client electronic device 44 from using that particular chunk.

In some implementations, the information to decrypt the encrypted first chunk of file 17 may be different than the information to decrypt the encrypted second chunk of file 17. For example, as will be appreciated, in a typical scenario, client electronic device 44 may start streaming the chunks of the video file as soon as the individual chunks are downloaded. However, the present disclosure may be implemented with a video file to be streamed without comprising on security. For example, in some implementations, rather than the same security token being used to encrypt 316 the various chunks of the video file (and sending that security token to client electronic device 44 upon successful downloading and validity scanning of the entire video file), security process 10 may generate a different security token, which may be randomly generated, with which to encrypt 316 each of these chunks. That is, each chunk may be encrypted with a different (or unique) security token. In some implementations, once that encrypted chunk passes the security scan and is downloaded to client electronic device 44, security process 10 may send the corresponding security token to client electronic device 44 so that it may decrypt and start streaming that particular chunk, even if other chunks have not yet been downloaded. As an added example and non-limiting advantage, by assigning a unique token to each chunk, it may help ensure that if malware exists in some of the chunks of the video file, the malware cannot exploit the system using the previously exchanged token (e.g., from a previous chunk of the video file encrypted with a different token).

In some implementations, if the video file is not received at computer 12 in order, security process 10 may treat the video file like a normal file with a single security token or encryption key. However, it will be appreciated that security process 10 may be capable of rearranging the file in order, chunking the segments, and using multiple keys.

It will be appreciated that while the terms "first segment, second segment" and "first chunk, second chunk, etc." are used, this is not to be construed as limiting to a specific order. That is, in some implementations, the second segment need not be the very next segment of the file after the first segment, and the second chunk need not be the very next chunk after the first chunk, etc.

While the present disclosure is described in terms of a file, it will be appreciated that any type of object capable of being uploaded and/or downloaded (e.g., data, metadata, transactional data, an application, pdf, docs, txt, bin, exe., zip, etc.) may be used without departing from the scope of the present disclosure. As such, the description of a file or video file should be taken as example only and not to otherwise limit the scope of the present disclosure.

In some implementations, the present disclosure may be embodied as a method, system, or computer program product. Accordingly, in some implementations, the present disclosure may take the form of an entirely hardware implementation, an entirely software implementation (including firmware, resident software, micro-code, etc.) or an implementation combining software and hardware aspects that may all generally be referred to herein as a "circuit," "module" or "system." Furthermore, in some implementations, the present disclosure may take the form of a computer program product on a computer-usable storage medium having computer-usable program code embodied in the medium.

In some implementations, any suitable computer usable or computer readable medium (or media) may be utilized. The computer readable medium may be a computer readable signal medium or a computer readable storage medium. The computer-usable, or computer-readable, storage medium (including a storage device associated with a computing device or client electronic device) may be, for example, but is not limited to, an electronic, magnetic, optical, electromagnetic, infrared, or semiconductor system, apparatus, device, or any suitable combination of the foregoing. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a digital versatile disk (DVD), a static random access memory (SRAM), a memory stick, a floppy disk, a mechanically encoded device such as punch-cards or raised structures in a groove having instructions recorded thereon, a media such as those supporting the internet or an intranet, or a magnetic storage device. Note that the computer-usable or computer-readable medium could even be a suitable medium upon which the program is stored, scanned, compiled, interpreted, or otherwise processed in a suitable manner, if necessary, and then stored in a computer memory. In the context of the present disclosure, a computer-usable or computer-readable, storage medium may be any tangible medium that can contain or store a program for use by or in connection with the instruction execution system, apparatus, or device.

In some implementations, a computer readable signal medium may include a propagated data signal with computer readable program code embodied therein, for example, in baseband or as part of a carrier wave. In some implementations, such a propagated signal may take any of a variety of forms, including, but not limited to, electromagnetic, optical, or any suitable combination thereof. In some implementations, the computer readable program code may be transmitted using any appropriate medium, including but not limited to the internet, wireline, optical fiber cable, RF, etc. In some implementations, a computer readable signal medium may be any computer readable medium that is not a computer readable storage medium and that can communicate, propagate, or transport a program for use by or in connection with an instruction execution system, apparatus, or device.

In some implementations, computer program code for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java®, Smalltalk, C++ or the like. Java® and all Java-based trademarks and logos are trademarks or registered trademarks of Oracle and/or its affiliates. However, the computer program code for carrying out operations of the present disclosure may also be written in conventional procedural programming languages, such as the "C" programming language, PASCAL, or similar programming languages, as well as in scripting languages such as Javascript, PERL, or Python. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the internet using an Internet Service Provider). In some implementations, electronic circuitry including, for example, programmable logic circuitry, field-programmable gate arrays (FPGAs) or other hardware accelerators, micro-controller units (MCUs), or programmable logic arrays (PLAs) may execute the computer readable program instructions/code by utilizing state information of the computer readable program instructions to personalize the electronic circuitry, in order to perform aspects of the present disclosure.

In some implementations, the flowchart and block diagrams in the figures illustrate the architecture, functionality, and operation of possible implementations of apparatus (systems), methods and computer program products according to various implementations of the present disclosure. Each block in the flowchart and/or block diagrams, and combinations of blocks in the flowchart and/or block diagrams, may represent a module, segment, or portion of code, which comprises one or more executable computer program instructions for implementing the specified logical function(s)/act(s). These computer program instructions may be provided to a processor of a general purpose computer, special purpose computer, or other programmable data processing apparatus to produce a machine, such that the computer program instructions, which may execute via the processor of the computer or other programmable data processing apparatus, create the ability to implement one or more of the functions/acts specified in the flowchart and/or block diagram block or blocks or combinations thereof. It should be noted that, in some implementations, the functions noted in the block(s) may occur out of the order noted in the figures (or combined or omitted). For example, two blocks shown in succession may, in fact, be executed substantially concurrently, or the blocks may sometimes be executed in the reverse order, depending upon the functionality involved.

In some implementations, these computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks or combinations thereof.

In some implementations, the computer program instructions may also be loaded onto a computer or other programmable data processing apparatus to cause a series of operational steps to be performed (not necessarily in a particular order) on the computer or other programmable apparatus to produce a computer implemented process such that the instructions which execute on the computer or other programmable apparatus provide steps for implementing the functions/acts (not necessarily in a particular order) specified in the flowchart and/or block diagram block or blocks or combinations thereof.

The terminology used herein is for the purpose of describing particular implementations only and is not intended to be limiting of the disclosure. As used herein, the singular forms "a", "an" and "the" are intended to include the plural forms as well, unless the context clearly indicates otherwise. As used herein, the language "at least one of A, B, and C" (and the like) should be interpreted as covering only A, only B, only C, or any combination of the three, unless the context clearly indicates otherwise. It will be further understood that the terms "comprises" and/or "comprising," when used in this specification, specify the presence of stated features, integers, steps (not necessarily in a particular order), operations, elements, and/or components, but do not preclude the presence or addition of one or more other features, integers, steps (not necessarily in a particular order), operations, elements, components, and/or groups thereof.

The corresponding structures, materials, acts, and equivalents (e.g., of all means or step plus function elements) that may be in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications, variations, substitutions, and any combinations thereof will be apparent to those of ordinary skill in the art without departing from the scope and spirit of the disclosure. The implementation(s) were chosen and described in order to explain the principles of the disclosure and the practical application, and to enable others of ordinary skill in the art to understand the disclosure for various implementation(s) with various modifications and/or any combinations of implementation(s) as are suited to the particular use contemplated.

Having thus described the disclosure of the present application in detail and by reference to implementation(s) thereof, it will be apparent that modifications, variations, and any combinations of implementation(s) (including any modifications, variations, substitutions, and combinations thereof) are possible without departing from the scope of the disclosure defined in the appended claims.

What is claimed is:

1. A method comprising:
   receiving, by a computing device, a plurality of file segments of a file, the plurality of file segments being received individually by the computing device;
   scanning, by the computing device, a first file segment of the file to identify the presence of malware within the file segment;
   encrypting, by the computing device, the first file segment of the file to create an encrypted file segment in response to identification by the scan of the first file segment that malware is absent from the first file segment;
   sending, by the computing device, the encrypted file segment of the file to another computing device before a second file segment of the file is received by the computing device;
   receiving the second file segment of the file by the computing device;
   encrypting the second file segment of the file to create an encrypted second file segment of the file;
   sending the encrypted second file segment of the file to the another computing device to download the encrypted second file segment of the file before a third file segment of the file is received by the computing device;
   scanning the second file segment of the file to determine validity of the second file segment of the file, wherein validity is indicative of an absence of the malware; and
   if the second file segment of the file is determined to be valid, sending the another computing device information to decrypt the encrypted second file segment of the file, and
   if the second file segment of the file is determined to be invalid, preventing the information from being sent to the another computing device to decrypt the encrypted second file segment of the file.

2. The method of claim 1 further comprising:
   determining that the file is valid; and
   determining that the file is completely downloaded to the another computing device.

3. The method of claim 2 further comprising sending the another computing device information to decrypt at least the encrypted file segment of the file in response to determining that each segment of the file is valid and in response to determining that the each segment of the file is completely downloaded to the another computing device.

4. The method of claim 3 wherein the information to decrypt the encrypted file segment of the file is different than the information to decrypt the encrypted second file segment of the file.

5. A computer program product residing on a non-transitory computer readable storage medium having a plurality of instructions stored thereon which, when executed by one or more processors, causes the one or more processors to perform operations comprising:
   receiving, by a computing device, a plurality of file segments of a file, the plurality of file segments being received individually by the computing device;

scanning, by the computing device, a first file segment of the file to identify the presence of malware within the file segment;
encrypting, by the computing device, the first file segment of the file to create an encrypted file segment in response to identification by the scan of the first file segment that malware is absent from the first file segment;
sending, by the computing device, the encrypted file segment of the file to another computing device before a second file segment of the file is received by the computing device;
receiving the second file segment of the file by the computing device;
encrypting the second file segment of the file to create an encrypted second file segment of the file;
sending the encrypted second file segment of the file to the another computing device to download the encrypted second file segment of the file before a third file segment of the file is received by the computing device;
scanning the second file segment of the file to determine validity of the second file segment of the file, wherein validity is indicative of an absence of the malware; and
if the second file segment of the file is determined to be valid, sending the another computing device information to decrypt the encrypted second file segment of the file, and
if the second file segment of the file is determined to be invalid, preventing the information from being sent to the another computing device to decrypt the encrypted second file segment of the file.

6. The computer program product of claim 5 wherein the operations further comprise:
determining that the file is valid; and
determining that the file is completely downloaded to the another computing device.

7. The computer program product of claim 6 wherein the operations further comprise sending the another computing device information to decrypt at least the encrypted file segment of the file in response to determining that each segment of the file is valid and in response to determining that the each segment of the file is completely downloaded to the another computing device.

8. The computer program product of claim 7 wherein the information to decrypt the encrypted file segment of the file is different than the information to decrypt the encrypted second file segment of the file.

9. A computing system comprising:
a memory; and
a processor coupled to the memory, and configured to:
receive, by a computing device, a plurality of file segments of a file, the plurality of file segments being received individually by the computing device;
scan, by the computing device, a first file segment of the file to identify the presence of malware within the file segment;
encrypt, by the computing device, the first file segment of the file to create an encrypted file segment in response to identification by the scan of the first file segment that malware is absent from the first file segment;
determine that the file is valid;
send, by the computing device, the encrypted file segment of the file to another computing device before a second file segment of the file is received by the computing device in response to determining that the file is valid;
receive the second file segment of the file by the computing device;
encrypt the second file segment of the file to create an encrypted second file segment of the file;
send the encrypted second file segment of the file to the another computing device to download the encrypted second file segment of the file before a third file segment of the file is received by the computing device;
scan the second file segment of the file to determine validity of the second file segment of the file, wherein validity is indicative of an absence of the malware; and
if the second file segment of the file is determined to be valid, send the another computing device information to decrypt the encrypted second file segment of the file, and
if the second file segment of the file is determined to be invalid, prevent the information from being sent to the another computing device to decrypt the encrypted second file segment of the file.

10. The computing system of claim 9 wherein the processor is further configured to determine that the file is completely downloaded to the another computing device.

11. The computing system of claim 10 wherein the processor is further configured to send the another computing device information to decrypt at least the encrypted file segment of the file in response to determining that each segment of the file is valid and in response to determining that the each segment of the file is completely downloaded to the another computing device.

12. The computing system of claim 11 wherein the information to decrypt the encrypted file segment of the file is different than the information to decrypt the encrypted second file segment of the file.

* * * * *